United States Patent [19]

Dalley

[11] 4,046,969
[45] Sept. 6, 1977

[54] DIAL PULSE REPEATING LINE CIRCUIT USING MINIATURE LINE TRANSFORMER

[75] Inventor: James Edwin Dalley, Denver, Colo.

[73] Assignee: Bell Telephone Laboratories, Incorporated, Murray Hill, N.J.

[21] Appl. No.: 711,811

[22] Filed: Aug. 5, 1976

[51] Int. Cl.² ............................................. H04Q 1/28
[52] U.S. Cl. .............................. 179/18 FA; 179/16 F
[58] Field of Search ................. 179/77, 16 F, 18 FA, 179/70, 2.5 R, 84 R, 84 A, 81 R; 336/170; 323/48

[56] References Cited

FOREIGN PATENT DOCUMENTS 2,254,168   7/1975   France ................................. 179/77

Primary Examiner—Thomas A. Robinson
Attorney, Agent, or Firm—Howard R. Popper

[57] ABSTRACT

A telephone line transformer having less iron in its core can be achieved by providing the transformer with a third winding to balance out the DC magnetization produced by the tip and ring windings. This winding must be bypassed by a capacitor of fairly large size to provide sufficiently low impedance at voice frequencies to prevent voice currents from flowing through the balancing winding. A capacitor of large enough size, however, may prevent the development of sufficient voltage change during dial pulsing for reliable dial pulse detection. This problem is solved by providing a dynamic capacitor bypass arrangement which includes a negative feedback operational amplifier together with a balancing winding bypass capacitor of reasonable size. The dynamic circuit magnifies the bypass capacitance with respect to voice frequency signals but saturates during dial pulsing and thus leaves the capacitance temporarily unamplified. The arrangement thus yields an effective bypass capacitance of approximately 35,000$\mu$f at voice frequencies from a 15$\mu$f capacitor which is small enough to permit adequate voltage changes to occur during dial pulsing.

8 Claims, 1 Drawing Figure

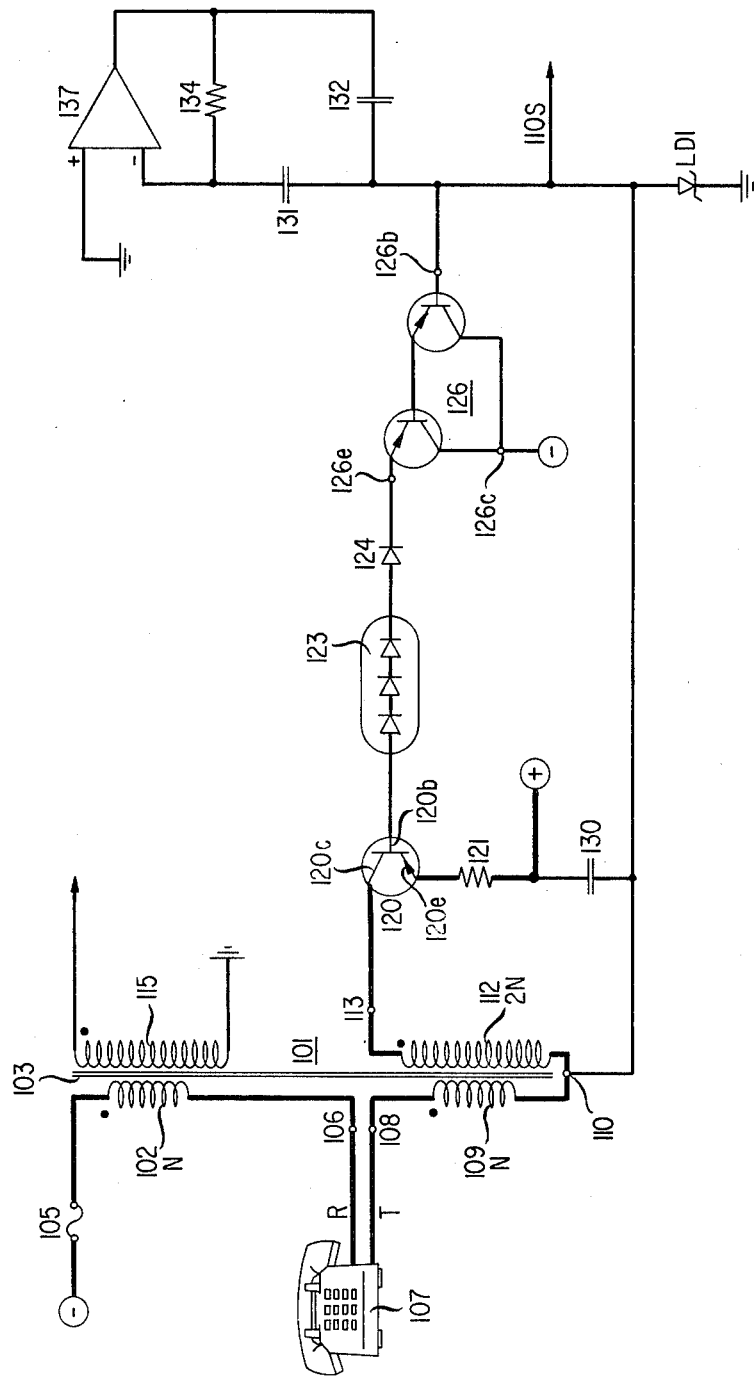

DIAL PULSE REPEATING LINE CIRCUIT USING MINIATURE LINE TRANSFORMER

Background of the Invention

This invention relates to telephone line circuits and, more particularly, to line circuits for supplying battery feed to one or more remote telephone sets.

Most line circuits for supplying the DC current required by the telephone sets' carbon microphone employ a line transformer. The transformer permits a balanced line circuit to be connected to an unbalanced switching path, it provides impedance transformation, and, if properly connected, it prevents longitudinal voltages appearing on the balanced line side from being coupled to its unbalanced side.

The line windings of the transformer either may be connected to carry the DC line current needed by the remote carbon microphone or they may be isolated from the DC current by means of a blocking capacitor. In the latter case, shunt feed inductors must usually be employed to prevent the low-impedance battery supply from short circuiting the AC components of the speech signal.

Heretofore, it has been suggested that the bulky current feed inductors could be replaced by a pair of opposite conductivity-type transistors biased for constant current operation to prevent excessive current on short loops and to provide adequate current on long loops. Examples of this type of shunt feed may be found in J. K. Livingstone U.S. Pat. No. 3,035,122, issued May 15, 1962, and in S. Orbach U.S. Pat. No. 3,955,052, issued May 4, 1976. It is to be noted, however, that these shunt feed arrangements require the use of a high quality blocking capacitor having low leakage and adequate capacitance to provide good AC coupling of speech signals to the transformer winding. In addition, the dielectric material of the blocking capacitor should be able to withstand lightning voltage surges of several hundred volts that may occur if one of the pair of carbon block protectors develops high impedance to ground with age.

On the other hand, in the conventional series feed arrangement, the two split primary windings of the line transformer respectively carry the DC microphone current to the tip and ring conductors of the telephone line. Unfortunately, the need to carry the DC current requires that more iron be employed in the transformer core to avoid core saturation. The increased size and weight of such construction detracts from the utility of series feed arrangements in the newer, lightweight and compact styles of construction which have come into vogue in the telephone industry with the advent of printed wiring boards and the expanding usage of integrated circuit technology.

In the copending application of J. F. O'Neill Ser. No. 711,809, filed of even date herewith, it is shown that the use of a third winding poled oppositely with respect to the tip and ring windings can be used to balance-out their net DC magnetization. The O'Neill application shows that the AC components of the speech signals may be bypassed by a capacitor if the third winding is driven from the collector circuit of a properly biased transistor. The high AC impedance of the transistor collector prevents the third winding from being short-circuited by the capacitor at voice frequencies. While it is important that the bypass capacitor be sufficiently large to offer a low impedance path to the wire components of speech signals, a capacitor of such size will prevent dial pulses from being easily detected. This is because when the loop conductors are opened during a dial pulse, the nominal 30 milliamperes of line current will be reduced to zero but will be restored within 50 milliseconds. Capacitance of several hundred $\mu f$, which is sufficiently large, effectively to bypass the third winding at audio frequencies will prevent a very large voltage change from occurring during the 50 millisecond loop open interval, as can be appreciated from the relationship, $V = 1/C \int i dt$. It would be extremely advantageous to be able to employ the constant current-driven O'Neill third winding line transformer and still to be able reliably to detect dial pulses using conventional transistor integrated amplifier circuitry.

SUMMARY OF THE INVENTION

I have discovered that a capacitor of small enough size not to impair the detection of dial pulsing signals may nevertheless be employed to bypass voice frequency currents flowing through the tip and ring windings from entering the balancing winding if the junction point of the third winding and the bypass capacitor is controlled by a dynamic, negative feedback amplifier circuit which multiplies the effective capacitance when only voice frequency signals are present in the tip and ring windings but which saturates when step function or dial pulsing signals are presented and which, therefore, temporarily leaves the effective value of the capacitor unchanged. In accordance with the illustrative embodiment, the aforementioned junction point is connected to the midpoint of a capacitive voltage divider, the ends of which are bridged between the negative input and output terminals of an operational amplifier in shunt with the feedback resistance. The positive input terminal of the amplifier is connected to a point of zero AC potential, which advantageously may be the point of connection for the DC operating potential for the amplifier. In accordance with an aspect of the illustrative embodiment, the dynamic bypass arrangements yields an effective capacitance reactance that can be expressed as $$X = -B/(A^2\omega^3 + B^2\omega), \qquad (1)$$

where A is the product of the capacitance of the two voltage divider capacitors and the feedback resistor and B is the sum of the capacitance of the bypass capacitor and the two voltage divider capacitors. In the illustrative embodiment where the bypass capacitor is of the order of $15\mu f$, the capacitive reactance exhibited to voice components is equivalent to a capacitance of over $35,000\mu f$.

BRIEF DESCRIPTION OF THE DRAWING

The foregoing and other objects and features of my invention may become apparent from the ensuing description when read together with the drawing, the single FIGURE of which shows a three-winding transformer line circuit employing the constant current supply and voice current bypass arrangement of my invention.

GENERAL DESCRIPTION

Transformer 101 includes a primary winding 102 connected between fused negative line battery 105 and terminal 106. The ring conductor R extends between the remote telephone set and terminal 106. Another primary winding 109 is connected between reference terminal 110 and terminal 108 to which tip conductor T leading from telephone set 107 is also connected. Primary windings 102 and 109 each have the same number of turns N and are poled so as to be series-aiding with respect to the magnetic field which they produce in core 103. A third or balancing winding 112, having as many turns as the sum of the turns comprising windings 102 and 109, is connected between reference terminal 110 and high impedance current feed terminal 113. Winding 112 is poled so as to be series-opposed with respect to flux field produced in core 103 by windings 102 and 109.

Transformer 101 includes a secondary winding 115 which operates in the conventional fashion of line circuit transformer secondary windings and will not be discussed further herein except to note that while primary windings 102 and 109 are designed to present a carefully balanced-to-ground impedance to the tip and ring conductors T, R of the line, the secondary winding 115 may be connected to a circuit which is unbalanced with respect to ground and thus serve to couple a balanced to an unbalanced circuit in the usual way.

The current supply path that is connected to current feed terminal 113 comprises transistor 120, the collector 120c of which is directly connected to terminal 113, and the emitter 120e of which is connected in circuit with emitter resistor 121 to a source of positive bias potential. The base 120b of transistor 120 is biased to remain out of saturation for the expected range of voltage variation at terminal 110 so that it will reflect at its collector terminal 120c a high impedance to terminal 113 and winding 112, connected thereto. In *Integrated Electronics* by Millman and Halkias, McGraw-Hill, 1972, at page 273, it is explained that the output impedance of the common emitter transistor circuit (where the emitter resistor is much larger than the sum of the internal resistance of the voltage source connected to the base and the base input resistance $h_{ie}$) is given by:

$$R_o \approx \frac{1 + h_{fe}}{h_{oe}} + \frac{(R_s + h_{ie})(1 + h_{oe}R_e)}{h_{oe}R_e}. \tag{2}$$

Using conventional values of h-parameters, the dynamic output resistance will thus be several hundred kilohms, at the very least. The emitter-base biasing circuit for transistor 120 comprises triple diode 123, single diode 124 and the two emitter-base drops of Darlington-connected transistor pair 126. The emitter 120e of series current feed transistor 120 is thus biased seven diode drops above the potential of reference terminal 110.

The voltage at terminal 110 is a function of loop current which, in turn, depends on loop length. This voltage is applied to the base 126b of the Darlington pair which provides base current to transistor 120 without drawing any appreciable current through the tip and ring conductors T, R. Accordingly, no line current that flows through windings 102 and 109 will fail to flow through winding 112 and, vice versa, the DC magnetization of windings 102 and 109 will be perfectly balanced by the current that flows through winding 112.

With respect to voice frequency currents in the tip and ring conductors T, R these currents flow through the serially-aiding tip and ring windings 109, 102 and capacitor 130 to the effective AC grounds present at the negative battery 105 and the positive battery at the junction of capacitor 130 and resistor 121. The signal level at the tip and ring may be as high as + 7 dBm. In a 600Ω loop system this requires a peak voltage of 2.45 volts. This full voltage is coupled to winding 112 of transformer 103 and is applied across the series combination of transistor 120, resistor 121 and capacitor 130. Most of the signal appears between the collector and emitter of transistor 120. With the emitter 120e returned to the fixed positive voltage, the collector must be more than 2.45 volts more negative than the emitter to prevent saturation on positive signal peaks.

The potentials at node 110 and at node 113 vary with the resistance of the line connected to conductors T and R. If the base 120b were held at a fixed potential, transistor 120 would act as a constant current source and would saturate when $I_L(R_{121} + R_L + R_{TRANS}) = 29V$, where $R_L$ is the loop resistance and $R_{TRANS}$ is the sum of the resistances of transformer windings 102, 109 and 112. Assuming $R_{TRANS} = 500\Omega$, and $R_{121} = 360\Omega$, for $I_L = 30mA$ the maximum loop resistance would be 556.67 ohms. Removing 200Ω for the station set gives a very short loop of 356.67Ω.

With 7 diode drops maintained between 120e and node 110, the loop current adjusts itself according to loop length and a fixed 2.8V is maintained between the collector and emitter of transistor 120 to accommodate the 2.45 volt peak modulation signal.

The dynamic impedance exhibited by collector 120c makes the branch circuit comprising terminal 110, winding 112, transistor 120, resistor 121 and the AC ground at the positive battery a very high impedance path compared to the branch from terminal 110 to positive battery that includes capacitor 130. Accordingly, the wire components of voice frequency current flow through the tip and ring windings and capacitor 130 but the induced voltage in winding 112 is presented with the high dynamic impedance of collector 120c. Because of the high dynamic impedance presented to winding 112 by collector 120c, capacitor 130 does not short-circuit winding 112 but is effective to bypass to ground alternating components of voice signal current flowing through windings 102 and 109.

From the standpoint of the alternating current equivalent circuit of transformer 101, the fused negative line battery 105 and the positive battery at the junction of resistor 121 and capacitor 130 are both effectively at AC ground. Capacitor 130 must effectively maintain terminal 110 also at an effective AC ground so that all AC components of voice signal current will flow only through windings 102 and 109. This would dictate that capacitor 130 should have as high a capacitance and hence as low an AC impedance as possible. A reactance of approximately 1 ohm at 200 Hz would be adequate to assure that the transformer maintains longitudinal balance of the loop circuit. This would require that capacitor 130 have a capacitance of approximately 680μf, a size which would effectively prevent sudden changes in potential at terminal 110.

It will be recalled that the negative feedback operational amplifier permits essentially no voltage difference to exist between its plus (+) and minus (−) input terminals and that neither input terminal draws any current. Accordingly, any current flowing upward through capacitor 131 must flow through resistor 134 since no current can enter the minus terminal of amplifier 137. The impedance seen at terminal 110 looking towards the junction point of capacitor 130 with capacitors 131 and 132 is given by dividing the voltage at terminal 110 by the total current leaving the terminal, or:

$$Z_{110} = V_{110}/(V_{131} + I_{130} + I_{134}), \tag{3}$$

where $I_{131}$ is the current through capacitor 131, $I_{130}$ is the current through capacitor 130 and $I_{134}$ is the current through resistor 134.

Writing the expression for each of the above currents in terms of the particular capacitance or resistance in its path, the impedance looking out of terminal 110 may be expressed ultimately as:

$$Z_{110} = -1/(A\omega^2 - jB), \tag{4}$$

where $$A = C_{131} \cdot C_{132} \cdot R_{135}, \tag{5}$$

and $$B = C_{131} + C_{132} + C_{130}. \tag{6}$$

Converting the expression for the impedance in equation (3) above to rectangular form shows that it is composed of a negative resistive component, $$R_{110} = -A/(A^2\omega^2 + B^2), \tag{7}$$

and a capacitive reactive component, $$X_{110} = -B/(A^2\omega^3 + B^2\omega). \tag{8}$$

For practical values of A and B, the B-terms of equation (7) and (8) can be dropped for frequencies in the audio band, so that $$R_{110} = -1/A\omega^2, \tag{9}$$

which has a very small magnitude at audio frequencies. The negative sign is, therefore, of no consequence to the circuit's function of providing a virtual AC ground at terminal 110. However, in arriving at the values that should be employed for capacitors 130, 131, 132 and resistor 134, it is to be considered that it would be desirable to permit the connection of as many as five telephone sets in parallel at terminals 106 and 108. The resistance reflected to terminal 110 by such an arrangements would be very low necessitating that $R_{110}$ be even lower so that the positive resistance will exceed the negative resistance to avoid oscillation. For $R_{110}$ to be less than 1 ohm at frequencies above 200 Hz, the A-term of equation (7) must be greater than $6.33 \times 10^{-7}$. Selecting capacitor 131 and capacitor 132 each to have a value of 1μf and resistor 134 to have a value of 620k ohms yields a value for $R_{110}$ of approximately 1.02 ohms and a value for $X_{110}$ of 0.023 ohms which is equivalent to a capacitance of 35,774μf. So long as amplifier 137 is operative, this large capacitance shunts balancing winding 112 at frequencies within the band of audio signals and effectively prevents any of the audio signal currents in the primary tip and ring windings 102, 109 from flowing through the balancing winding. Because of the negative sign of $R_{110}$, capacitor 130 must be chosen large enough to prevent oscillation at low frequencies. Resonance will occur at some frequency where the effective capacitive reactance $X_{110}$ equals the inductive reactance of the windings of transformer 101. In practice, it has been found that a value of capacitor 130 of the order of 10 to 15μf is adequate to guarantee stability within the tolerances of commercially available tantalum capacitors and other components.

It can be appreciated that the voltage at the output of amplifier 137 is the same as the voltage drop in resistor 134, the current through which is the same as that through capacitor 131. The current through capacitor 131 is given by the product of its reactance and $V_{110}$ and that current multiplied by the resistance 134 is the output voltage of amplifier 137. Referring to equation (4) and its dependency on the values of capacitor 131 and resistor 134, it would be advantageous to keep the values of these components small to avoid large signals at the amplifier output. The value of capacitor 132 should not be made so large, however, as to load the amplifier output. On the other hand, terminal 110 is so well by-passed at audio frequencies that $V_{110}$ is very small so that the amplifier output remains in the linear region.

As mentioned above, it is desirable to permit the voltage of terminal 110 to change during dial pulsing so that dial pulses can be detected. The nominal value of loop current during the off-hook condition should be approximately 30 milliamperes and this value of current must be brought to zero within the 50 millisecond interval between dial pulses. In order to achieve a sufficient voltage change at terminal 110, the effective capacitance thereat should be no greater than that of capacitor 130, which itself must not be so large that the integral $1/C \int idt$ will be too small in the 50 millisecond interval to develop a reliably detectable voltage change. A reasonable voltage change is achieved, in fact, since the amplifier saturates in response to the step function input. The saturation of amplifier 137 can be understood to occur when its output voltage approaches that of either the positive or negative voltage of the DC power supplies (not shown) required to operate the amplifier, depending on the polarity of the signal applied to its minus input. Obviously, the output voltage cannot change by more than the magnitude of this supply voltage.

Applying Kirchhoff's voltage equations to the voltage divider comprising capacitors 131 and 132 and the feedback resistor 134, it is apparent that the voltage output of amplifier 137 is given by:

$$V_o = j \omega C_{131} R_{137} V_{110}. \tag{10}$$

The output voltage is thus a function of the frequency $\omega$ of the signal input to the amplifier. When dial pulsing occurs the step function discontinuity in loop current flow is equivalent to an extremely high frequency signal burst. The high frequency of the step function input due to dialing causes a very great change at the output of amplifier 137 which change tends to exceed that of amplifier 137's supply voltage causing the amplifier to cease functioning. When amplifier 137 ceases to function, the only capacitance connected to terminal 110 is that of capacitor 130 itself, which capacitance is sufficiently small, in the absence of amplifier 137, not to affect the detection of dial pulses. A simple external transistor isolating amplifier (not shown) may thus be connected at terminal 110S to refect the change in potential at terminal 110 effective by the appearance of the dial pulse.

It is to be understood that the foregoing is only illustrative of the principles of my invention. Numerous modifications such as the substitution of an alternative base current source to drive current supply transistor 120 may be made so long as the current therethrough does not longitudinally unbalance transformer 101. Other modifications may be made by those of ordinary skill in the art without departing from the spirit and scope of my invention.

What is claimed is:

1. In a telephone line circuit having a transformer including a balancing winding serially connectable to the tip and ring windings and poled so as to counterbalance the DC magnetization thereof together with a capacitor joined to said windings for bypassing audio frequency current around said balancing winding, an arrangement for dynamically multiplying the apparent capacitance exhibited by said winding at audio frequencies except during dial pulsing, said arrangement comprising a capacitive voltage divider and an operational amplifier, the midpoint of said divider being connected to the point of junction of said bypass capacitor with said balancing winding and the ends of said divider being connected between an input and the output of said amplifier.

2. The invention of claim 1 wherein one capacitor of said voltage divider is connected from said midpoint to a negative input terminal of said amplifier, said one capacitor being proportioned to cause said amplifier to saturate for signals having frequency components associated with step function voltage changes occurring during dial pulsing.

3. A telephone line circuit comprising:
 a transformer having tip, ring and balancing windings, said balancing winding being poled in opposite sense to said tip and ring windings;
 current source means serially connected in circuit with said tip, ring and balancing windings; and
 saturable dynamic capacitor means in shunt with said balancing winding.

4. The combination of claim 3 wherein said saturable dynamic capacitor means comprises:
 a first capacitor providing an audio frequency path in shunt with said balancing winding and said tip and ring windings;
 a capacitive voltage divider comprising a second and third capacitor, the midpoint of said voltage divider being connected to said first capacitor; and
 an operational amplifier having its input and output connected to the ends of said voltage divider.

5. The combination of claim 4 wherein said operational amplifier is a differential amplifer having positive and negative inputs, means for providing an audio frequency ground at said positive input, and means connecting said negative input to one end of said voltage divider.

6. The combination of claim 5 wherein said current source means includes the collector-emitter path of a transistor; said collector of said transistor being connected to said balancing winding and said first capacitor being connected to the emitter of said transistor.

7. A telephone line circuit comprising:
 a transformer having tip, ring and balancing windings;
 said balancing winding being poled to counterbalance the DC magnetization of said tip and ring windings;
 a capacitor for bypassing audio frequency currents from said balancing windings;
 means including the collector circuit of a transistor connected to said balancing winding for presenting a high AC impedance thereto; and
 saturable dynamic capacitor means including anamplifier means and a negative feedback means therefor and means connecting a point in said negative feedback means to said bypass capacitor.

8. The invention of claim 7 wherein said negative feedback means includes a first resistive branch connecting the output with the negative input of said amplifier, the positive input of said amplifier being grounded, and a second branch including a pair of serially connected capacitors in shunt with said resistor, the common junction point of said serially connected capacitors being connected to said first bypass capacitor.

* * * * *